(12) United States Patent
Wu

(10) Patent No.: US 7,621,692 B2
(45) Date of Patent: Nov. 24, 2009

(54) POROUS CERAMIC PAVING MATERIAL

(75) Inventor: Raymond Wu, South San Francisco, CA (US)

(73) Assignee: Airostone Corp., San Bruno, CA (US)

( * ) Notice: Subject to any disclaimer, the term of this patent is extended or adjusted under 35 U.S.C. 154(b) by 503 days.

(21) Appl. No.: 11/318,005

(22) Filed: Dec. 23, 2005

(65) Prior Publication Data

US 2006/0245825 A1    Nov. 2, 2006

Related U.S. Application Data

(60) Provisional application No. 60/676,598, filed on Apr. 29, 2005.

(51) Int. Cl.
*E01C 11/00* (2006.01)

(52) U.S. Cl. .......................... 404/17; 404/71
(58) Field of Classification Search .................. 404/17, 404/19, 44, 71
See application file for complete search history.

(56) References Cited

U.S. PATENT DOCUMENTS

| 4,606,963 | A | * | 8/1986 | Farrell | 428/150 |
| 5,395,673 | A | * | 3/1995 | Hunt | 428/148 |
| 5,766,338 | A | * | 6/1998 | Weber | 106/705 |
| 5,788,407 | A | * | 8/1998 | Hwang | 404/81 |
| 6,468,942 | B1 | * | 10/2002 | Sansalone | 502/402 |
| 6,767,160 | B2 | * | 7/2004 | Sansalone | 404/17 |
| 6,776,556 | B2 | * | 8/2004 | Hessner | 404/44 |
| 7,341,661 | B2 | * | 3/2008 | Sansalone | 210/263 |
| 2002/0090261 | A1 | * | 7/2002 | Sansalone | 404/17 |
| 2002/0159836 | A1 | * | 10/2002 | Hessner | 404/44 |
| 2004/0208697 | A1 | * | 10/2004 | Sansalone | 404/17 |

FOREIGN PATENT DOCUMENTS

| JP | 4-247104 | * | 9/1992 |
| JP | 5-239459 | * | 9/1993 |
| JP | 9-328352 | * | 12/1997 |
| JP | 10-204809 | * | 8/1998 |
| JP | 10-226788 | * | 8/1998 |
| JP | 2000-136501 | * | 5/2000 |

* cited by examiner

*Primary Examiner*—Gary S Hartmann
(74) *Attorney, Agent, or Firm*—Nixon Peabody LLP

(57) ABSTRACT

The disclosure is directed to a method of constructing a porous, ceramic pavement that is permeable to aqueous fluids and more resistant to acidic rainwater than concrete. The method includes selecting a porous, ceramic paving material having a compressive strength sufficient for a particular use of a surface to be paved. A base material can be selected to serve as a support for the paving material, wherein the base material is permeable to aqueous fluids. The base material is applied to the surface to be paved, and the paving material is positioned on top of the base material to provide a porous, ceramic pavement.

15 Claims, 3 Drawing Sheets

POROUS CERAMIC PAVING MATERIAL

CROSS REFERENCE

This application claims the benefit of U.S. Provisional Application No. 60/676,598, filed Apr. 29, 2005.

BACKGROUND

1. Field of the Invention

This invention is directed to methods of making and using paving materials and, more specifically, a novel porous, ceramic paving material.

2. Description of the State of the Art

Human development has taken away much of our natural areas. The prevalence of impermeable paving on developed land has led to a decrease in groundwater recharge and an increased risk of contamination, as runoff from rain washes surface pollutants directly into our waterways. Furthermore, this high flow rate of runoff can also result in an increase in erosion.

To combat this problem, traditional pavers have been installed with gaps for water to seep through, but this creates safety and accessibility issues as well as the need for an additional material, such as grass or sand, to fill the gaps. Traditional pavers are also often made from a concrete-based material and, unfortunately, concrete suffers degradation from rainwater, since rainwater is often acidic. As a result, a porous concrete that is permeable to rainwater is destined to fail under such conditions, and society is forced to use substantially impermeable concrete systems instead and suffer the consequences.

Accordingly, an improved paving material that is not only strong enough to serve as a paving material in a range of applications, but is also permeable to aqueous fluids and resistant to chemical degradation, can provide a benefit to society by allowing our land to get the rainwater it needs and creating less pollution and erosion from run-off problems that exist with currently used materials.

SUMMARY

Embodiments of the present generally encompass porous, ceramic paving materials. In some embodiments, the invention is a porous, ceramic paving material comprising a heat-treated component comprising a metal oxide and a filler material, wherein the filler material contributes to the porosity of the paving material, and the paving material is permeable to aqueous fluids and more resistant to acidic rainwater than concrete.

In some embodiments, the invention is a method of creating the porous, ceramic paving material. The method includes preparing a composition comprising a metal oxide and a filler material, and the preparing includes selecting the filler material to provide a desired porosity to the paving material. The filler material is mixed with the metal oxide, and the composition is formed into a desired shape by applying pressure to the composition in a mold. The formed composition is then heat-treated to create the porous, ceramic paving material, wherein the paving material is permeable to aqueous fluids and more resistant to acidic rainwater than concrete.

In some embodiments, the invention is a method of constructing a porous, ceramic pavement. The method includes selecting a porous, ceramic paving material having a compressive strength sufficient for a particular use of a surface to be paved. A base material can be selected to serve as a support for the paving material, wherein the base material is permeable to aqueous fluids. The base material is applied to the surface to be paved, and the paving material is positioned on top of the base material to provide a porous, ceramic pavement.

DETAILED DESCRIPTION

As discussed in more detail below, the embodiments of the present invention generally encompass porous, ceramic paving materials. The "paving material" can include a material that provides a hardened, treated, or finished surface that may be exposed to the wear of traffic that can include foot traffic or vehicle traffic. Generally speaking, the paving material of the present invention includes a ceramic covering for any surface that can benefit from an improved durability and, particularly, those surfaces that can benefit from an added feature of permeability to aqueous solutions, such as rainwater. The teaching provided below is directed to making and using these novel porous, ceramic paving materials.

Figure 1:
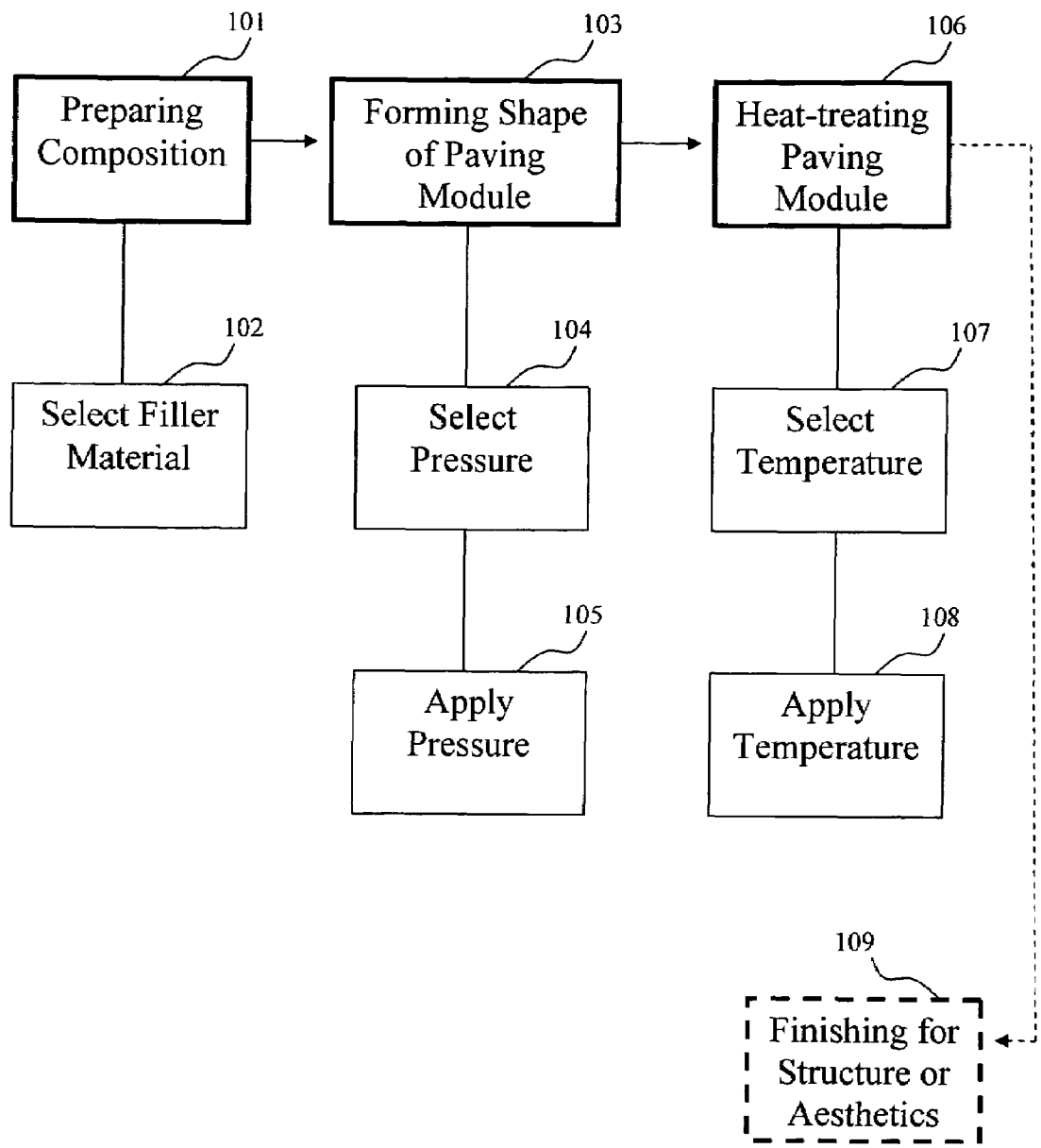
FIG. 1 illustrates a method of making porous, ceramic paving materials according to some embodiments of the present invention.

FIG. 1 illustrates a method of making porous, ceramic paving materials according to some embodiments of the present invention. The porous, ceramic paving materials of the present invention are made by preparing 101 a composition comprising a metal oxide and a filler material. The preparing includes carefully selecting 102 a filler material to assist in producing the desired porosity in the paving material. The metal oxide and filler material are mixed together to form the composition. The composition is then formed 103 into a desired shape by carefully selecting 104 and applying 105 pressure to the composition in a mold. A virtually infinite number of shapes and designs can be formed. A final step in the process is heat-treating 106 the shaped composition to create the porous, ceramic paving material, wherein the heat-treating includes carefully selecting 107 the temperature of the treatment for control over physical properties of the paving moldule, such as pore structure and strength, and applying 108 the temperature for a predetermined amount of time. A finishing step 109 can also be used in some embodiments, for example, to modify the paving material structurally to enhance function and/or aesthetics.

An earthy material, such as a soil, can be used as the source of metal oxides. The soil should include metal oxides selected from a group consisting of oxides of aluminum, silicon, iron, titanium, cobalt, calcium, magnesium, sodium, and potassium. In some embodiments, the metal oxide can be selected from a group consisting of $Al_2O_3$, $SiO_2$, $Fe_2O_3$, $TiO_2$, $CoO$, $MgO$, $Na_2O$, $K_2O$, hydrated forms thereof, or combinations thereof. In some embodiments, the metal oxide can include $Al_2O_3$, $SiO_2$, hydrated forms thereof, or combinations thereof. Examples of hydrated forms of the metal oxides are known to those skilled in the art. Hydrated forms of aluminum oxide include, for example, $Al_2O_3 \cdot nH_2O$, where n can be an integer ranging from 1 to 3.

One of skill in the art will appreciate that earthy materials, such as soil, can be selected from a variety of compositions that are particular to the geographic region of the source. Clay is one of the three principal types of soil, the other two being sand and loam. A certain amount of clay is a desirable constituent of soil, since it binds other kinds of particles together and retains water. Clay consists of soil particles the diameters of which are less than 0.005 mm, and also consist of a rock that is composed essentially of clay particles. Impure clays may be used to make bricks, tile, and the cruder types of pottery, while kaolin, or china clay, is required for the finer grades of ceramic materials.

In some embodiments, the soil is selected to contain from about 5% to about 15% organic material by weight. In some embodiments, the soil is selected to contain from about 2% to about 8% organic material by weight. In some embodiments, the soil is selected to contain less than about 5% organic material by weight. The composition of the earthy material can vary, and component concentrations can be controlled by blending in other components. In some embodiments, the earthy materials can include 35 to 55 percent clays or argillaceous (clayey) shales, 25 to 45 percent quartz, and 25 to 55 percent feldspar. In some embodiments, the earthy material can include about 50% $SiO_2$ and about 40% $Al_2O_3$. In some embodiments, flint clay can be used as the soil to make the paving materials of the present invention.

Other additives can be included to control the color of the finished product. The color of the finished product will rely most often in the types and amounts of iron oxides present in the raw materials. Colors can range from a pale yellow to black with light shades of brown to red in-between, depending upon whether an oxidizing or reducing atmosphere exists in the kiln. The color of the metal oxide is adjusted by controlling the degree of oxidation.

Examples of metals that form colored oxides include antimony, which can be used in combination with lead and can form a yellow color; chromium can also be used to produce a yellow color; cobalt can be used to form a blue color; copper can be used to form a green or red color; gold can be used to form a purple color; iron can be used to form a yellow, red, or black color; manganese can be used to form a purple or brown color; and tin can be used to form a white color. Any metal or combination of metals known to one of skill in the art can be used to provide a desired color to the final product. It should be appreciated by one of skill that process variables such as the concentration of the metals and the amount of metal oxidation that results from the heat-treatment should be preselected carefully to control the color of the final product.

Without intending to be bound by any theory or mechanism of action, the clay portion of a soil can provide the ability to shape the paving material into a module, i.e. a unit that can be interconnected to form a pavement. The quartz (silica) portion of a soil can serve as a filler and provide strength to the formed module; and, the feldspar portion can serve as a fluxing agent to lower the melting temperatures of the clay and quartz during heat-treatment, sometimes referred to as firing, of the paving material. A desirable soil composition can be found directly in shale deposits, such that blending to obtain these proportions is often not necessary. In some embodiments, little or no beneficiation, or crushing and grinding of the mined material, is necessary to prepare a composition. In most embodiments, however, local clays or shales having a highly variable composition are used in order to keep transportation costs as low as possible.

In embodiments using flint clay as the soil and sand as the filler, the flint clay can comprise from about 8-20% of the composition. Accordingly, the sand can comprise most of the remainder of the composition, which will comprise about 80-92% of the composition. Other minor components may be present as impurities in many embodiments without affecting the ability of the paving material to perform its intended use. It should be appreciated that the manufacturing parameters, e.g. filler material, forming pressure, and/or temperature, may need to be adjusted to provide desired performance characteristics in a paving material formed from these somewhat variable compositions.

Other components known to those of skill in the art can added to hold the shape of the molded composition in preparation for heat-treatment. Any bonding agent known to one of skill in the art of ceramics can be used. The bonding agent serves as a temporary holding agent to maintain the desired shape of the composition for the heat-treatment step and can also enhance bonding within the structure of the final product. Flint clay, for example, can be used as the soil or as a bonding agent for other soils. The flint clay should contain high percentages of silica and alumina and have few impurities, such as lime, magnesia, soda, and potash, each of which lower the fusion point of the clay. It should be appreciated that the soil can serve as its own bonding agent to hold the shape of the molded composition together for the heat treatment, where the organic component burns away during the heat treatment to leave a fused material.

In addition, filler materials are added to the composition and are carefully selected to assist in the control of the porosity and, accordingly, the permeability of the paving material to aqueous fluids. Any filler material known to one of skill in the art can be used and include, but is not limited to, sand and/or gravel. In some embodiments, the filler material can include ceramic particles, glass particles, or metal oxides.

In some embodiments, the metal oxides can have a melting point that is higher than the heat-treating temperature used to harden the composition into the final product, and such particles can also be added to provide the final product with a non-slip surface by providing protuberances on a traffic bearing surface used for walking or driving. In some embodiments, the filler material can include particles having average diameters that range from about $1/32$ of an inch to about $1/4$ of an inch, from about $1/16$ of an inch to about $1/4$ of an inch, from about $1/16$ of an inch to about $1/8$ of an inch, from about $1/4$ of an inch to about $1/8$ of an inch, or any range therein. The particle diameters, and distribution of particle diameters can be obtained and designed using particle fractionation methods known in the art.

The composition should be well-mixed in preparation for forming the composition into a desired shape. Any method of mixing such a composition known to one of skill in the art can be used. In some embodiments, the forming of the composition into a desired shape should be done under fairly dry conditions. In these embodiments, the formed composition should have a water concentration ranging from about 0.05% to about 10%, from about 1% to about 7%, from about 1% to about 6%, or from about 2% to about 5% by weight as the formed composition enters the heat-treating step.

Pressure is applied to the composition to form the desired shape to be heat-treated. The amount of pressure applied can be varied to control the average density, as well as the uniformity of the density, of the formed composition. A uniform, or substantially uniform, density distribution should be developed across the formed composition to create a final product that is uniform in structure and physical characteristics. Structural characteristics include, but are not limited to, porosity and shape. Physical characteristics include, but are not limited to, compressive strength, and permeability. The pressure applied to form the shape of a composition ranges from about 500 psi to about 3000 psi. In some embodiments, the amount of pressure applied to form the shape of a composition can range from about 700 psi to about 2200 psi, from about 1000 psi to about 2000 psi, or any range therein.

Control over the pressure used to form the desired shape from the composition provides control over the porosity, permeability, and compressive strength of the final product. For example, the compressive strength of the final product increases with an increase in the amount of pressure applied to form the shape of a composition, whereas the porosity of the final product decreases with an increase in pressure. And, a decrease in porosity can result in a decrease in the permeability of the final product to aqueous fluids, such as rainwater. Accordingly, one of skill will appreciate that the performance characteristics of the final product can be tuned through a careful selection of components for a composition, as well as through a careful selection of the pressure used to form a desired shape from the composition.

The amount of pressure applied to form the shape of a composition depends on a variety of factors including, but not limited to, the thickness of the formed composition. The thickness of the final product can range from about 0.5 inches to about 6.0 inches, from about 1.0 inch to about 5 inches, from about 1.5 inches to about 4 inches, from about 2.25 inches to about 4 inches, from about 1.5 inches to about 2.25 inches, or any range therein. The pressure applied to the composition can be obtained from any molding apparatus known to one of skill in the art.

In some embodiments, a pressure ranging from about 500 psi to about 1000 psi can be applied to form the shape of a composition ranging in thickness from about 1.5 inches to about 2.25 inches. In some embodiments, from about 2000 psi to about 3000 psi can be used to form the shape of a composition ranging in thickness from about 3.0 inches to about 4.0 inches.

The pressures can be varied to produce different compressive strengths. For example, a 3000 psi pressure can be applied to a 1.5 inch thick composition to obtain a high strength as compared to applying a 1000 psi pressure to a 2.25 inch thick composition to obtain a higher porosity and relatively lower compressive strength. The general rule, however, is that to obtain a particular compressive strength from a given composition, as the thickness of the desired shape increases, the amount of pressure required to form the shape from the given composition also increases. In most embodiments, the compressive strength can range from about 4000 psi to about 12,000 psi, from about 5000 psi to about 10,000 psi, from about 6000 psi to about 8000 psi, or any range therein. In some embodiments, the minimum required compressive strength will range from about 4000 psi to about 5000 psi for light vehicle traffic.

In some embodiments, the paving material can be formed into a module having a shape that provides an added function, such as enhancing the structural integrity of the paving surface, providing a non-slip traffic surface, or providing support for the addition of other structural components unrelated to paving. In one example, the module can be a unit that is used in a repetitious juxtaposition with similar components, with components that are not modular, or alone in combination with many other identical modules to construct a pavement. In another example, the module can have a shape that is complementary to a component that is used in landscaping, such as a structural brick used in the formation of a flower bed or some other decorative structure.

A final step in creating the porous, ceramic paving material is the heat-treating step, but the formed composition must be dried to less than about 5%, less than about 3%, less than about 1%, or any range therein, before entering the heat-treating step in order to preserve the desired shape and/or physical properties of the paving material. As discussed above, the properties exhibited by the final product can be designed by designing the composition in terms of selecting the particle sizes and components, as well as the pressure used to form the desired shape of the composition.

In addition, the heat-treating temperature contributes to the ultimate microstructure of the paving material. In fact, it should be appreciated that the selection of temperature and time affects the physical properties of a paving module. The temperatures used for heat-treating in the present invention range from about 1000° C. to about 1500° C., from about 1100° C. to about 1300° C., from about 1150° C. to about 1250° C., or any range therein. At these temperatures, some filler particles may not be melted, but the clay or shale ingredients can be selected to contain sufficient impurities to allow for melting and formation of a glass within the composition, thus bonding the particles together. The heat-treating time ranges from about 12 hours to about 36 hours, from about 18 hours to about 30 hours, from about 22 hours to about 26 hours, or any range therein.

Crystalline mullite needles can enhance strength by growing into the glassy phase. The resulting microstructure can consist of large secondary particles embedded in a matrix of fine-grained mullite and glass and can contain a substantial volume of pores. The size and number of pores is a controllable design parameter that affects the physical properties of the paving module. For example, if the heat-treating is insufficient, the products can have a low strength and poor resistance to frost and freezing, owing to the presence of many small pores in regions of the paving material. Too much heat-treating can result in the formation of too much glass. The paving material can be strong, but it can also be brittle and susceptible to failure under mechanical and thermal stress.

Figure 2A:
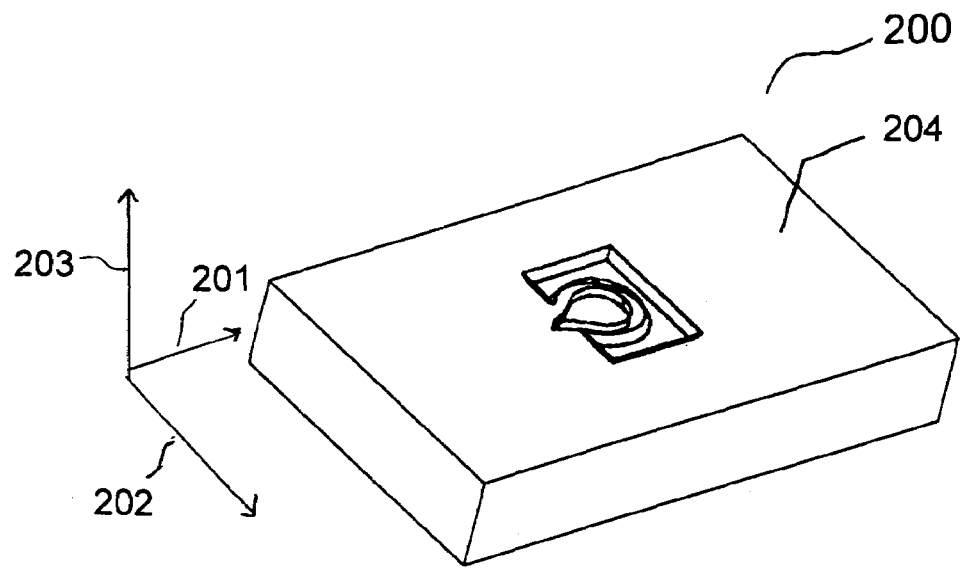
FIGS. 2A and 2B illustrate shapes that may be desirable according to some embodiments of the present invention.
Figure 2B:
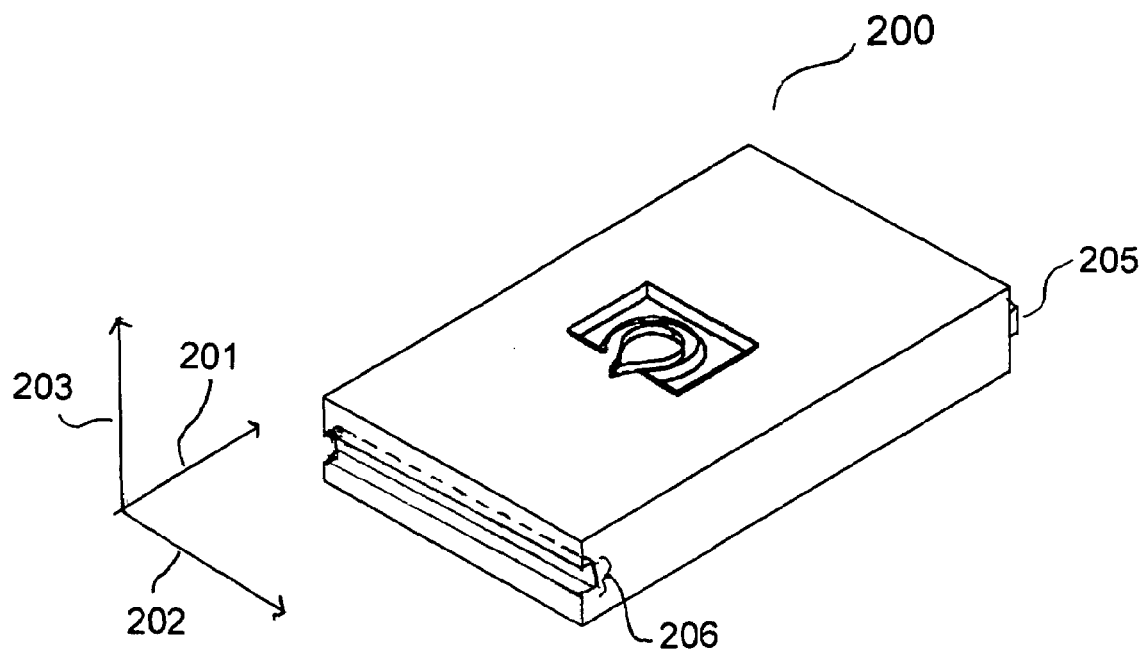

FIGS. 2A and 2B illustrate shapes that may be desirable according to some embodiments of the present invention. FIG. 2A illustrates a paving module. The structural integrity of a paving surface can be enhanced by shaping the paving material into interlocking units 200, i.e. modules, where the units 200 provide resistance to in-plane movement 201, 202 but may or may not provide resistance to out-of-plane movement 203. Out-of-plane movement 203 would be a relative movement between paving units 200 that is in a direction normal or substantially normal to the traffic surface 204. Examples of interlocking units 200 that provide resistance to out-of-plane movement 203 would include, for example, a tongue-in-groove structure as illustrated in FIG. 2B. In some embodiments, a machining step could be added to provide resistance to an out-of-plane movement between paving units by providing such tongue 205 and groove 206 structures. In most embodiments, any interlocking design known to one of skill can be used with the present invention.

Figure 3:
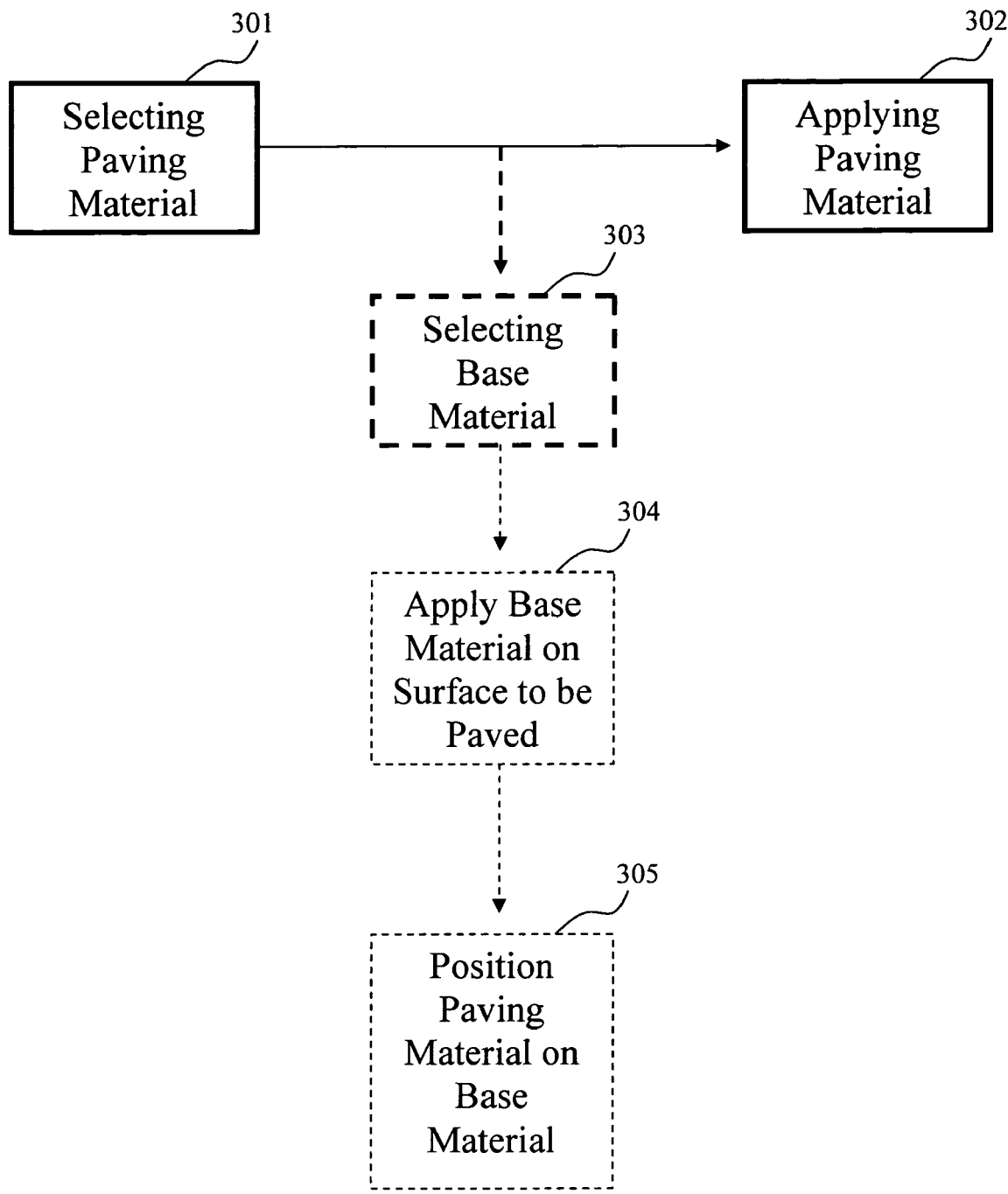
FIG. 3 illustrates a method of constructing a porous, ceramic pavement according to some embodiments of the present invention.

FIG. 3 illustrates a method of constructing a porous, ceramic pavement according to some embodiments of the present invention. The method includes selecting 301 a porous, ceramic paving material having a compressive strength sufficient for a particular use and applying 302 the paving material to the surface to be paved. Teachings of how to make such a paving material are provided above.

Although not strictly necessary, most embodiments will include selecting 303 a base material to serve as a support for the paving material. The base material should also be permeable to aqueous fluids. The base material is applied 304 to the surface to be paved, and the paving material is positioned 305 on top of the base material to provide a porous, ceramic pavement.

Factors involved in selecting the porous, ceramic paving material are discussed above. A factor that should be considered carefully is the thickness of the paving material, since selecting the thickness of the paving material can include considering structural factors that are not associated with compressive strength.

In some embodiments, for example, a walking surface can be paved using a 1.5 inch thick paving material having a compressive strength that exceeds 8000 psi. This high amount of compressive strength may be considered unnecessary for such a surface, but the thickness may be otherwise necessary for enhancing structural integrity at each joint formed between adjacent modules of the paving material. A thinner paving material may not provide a sufficient contact area between paving modules to provide a paving structure with enough structural integrity between modules.

Although the paving material can be applied to a surface alone, in many embodiments, a base material is applied to the surface to provide a proper support and drainage between the paving material and the surface to be paved. In some embodiments, the base materials include, but are not limited to, sand, gravel, or a combination of sand and gravel. Any base materials known to one of skill in the art can be used, and in some embodiments, the base materials can comprise a combination of layers separated by a barrier layer to prevent migration of materials between the combination of layers. In some embodiments, the base material can be a scaffolding that forms a support structure between the surface to be paved and the paving material. This type of base material is commonly used in the paving of structures that are in locations in which the use of sand and gravel is not practical, such as in the paving of balconies.

EXAMPLES

Example 1

Method of Making a Paving Module

Flint clay was the chosen as the soil and sand was chosen as the filler material. The flint clay was combined with the sand at a ratio of about 20% soil to about 80% filler. Flint clays can vary in composition, and the composition of a particular flint clay is particular to the region from which the flint clay was obtained. The flint clay used in this example was obtained from Shandong Province, China. Likewise, sand grade and quality is specific to the region from which it was obtained. The sand for the filler can be a low grade sand, variable in grit size, and the sand used in this example was also be obtained from Shandong Province, China. It should be appreciated that with this variation in material compositions, process parameters such as the filler material, the pressure used to form the desired shape, and the heat-treating temperature may need to be adjusted to obtain a desired performance characteristic from a particular material composition.

The flint clay and sand was then mixed dry (i.e. ambient air moisture conditions) into a granular form using any mixer available to one of skill in the art and suitable for mixing soils. A low rpm blade mixer that turns at about 60-200 rpm was used for the present example. The mixture was then placed into a mold and pressed into a block form that was 20 cm long, 10 cm wide, and 6 cm thick using about 30 metric tons of force to produce a pressure of about 2200 psi.

The pressed block was then removed from the mold and placed on an oven rack and dried to under 3% moisture for about 12 hours to about 24 hours at about 50° C. to about 80° C. The dried, pressed block was then placed into an oven to heat-treat the block at about 1100° C. for about 24 hours to about 48 hours. The time at temperature varies depending on the number of paving material modules present in the oven. Normally, the heat-treating time is about 30 hours for a normal set of paving modules. The paving material was found to have a compressive strength of about 12,000 psi as measured using the ASTM C-936 method.

Optionally, color is added throughout the composition or as a topcoat. A topcoat mixture, for example, is added as a 3-6 mm thick surface. A topcoat may be preferred from a manufacturing standpoint, because its less expensive to add the coloring as a topcoat as less material is required. However, coloring throughout the paving material may be preferred from a performance standpoint, because a damaged material will not exhibit a discoloration that would otherwise appear from a chipping of colored topcoat. The topcoat mixture is made the same way, but you add the metal oxide coloring to the flint clay and the sand. The topcoat mixture is added first as a 3-6 mm layer in the mold, and the bulk of the paving module is then added on the topcoat layer. The metal oxide for coloring can be obtained from Shandong Province, China.

Any grade of sand can be used for the optional color layer, and the sands used for the present invention were obtained from Shandong Province, China. The coloring layer is often produced from a fine grade of sand for a more aesthetic appearance. It should be appreciated, however, that the use of a fine sand topcoat will affect the permeability of the paving to aqueous fluids, such as rain water. Suitable sands can range from about 80 grit to about 200 grit depending on the smoothness and permeability that is desired.

Example 2

Permeability Testing

A clear plastic tube was glued to the surface of the paving material made in Example 1. The clear plastic tube was approximately 2.0 inches in diameter and about 5.0 inches in height. The tube was filled with 5.0 inches of room temperature tap water, such that the tap water was allowed to permeate the room temperature paving material. The rate of permeation was measured.

The permeation rate of a dry paving material was found to be about 2.5 inches per minute, whereas the permeation rate of a saturated paving material was found to be about 1.0 inch per minute. The implementation of a base material was found to enhance permeation, where the base material was able to break the surface tension of the aqueous fluid as it exited the paving material, thus assisting in the movement of the tap water out of the paving material. A base material such as a scaffolding used in paving a balcony would provide limited contact on the bottom surface of a paving material, whereas sand would provide a much higher degree of contact.

While particular embodiments of the present invention have been shown and described, those skilled in the art will note that variations and modifications can be made to the present invention without departing from the spirit and scope of the teachings. One of skill will appreciate that the teachings have been provided by way of example only and are not intended to limit the scope of the invention.

I claim:

1. A porous, ceramic paving material comprising
a heat-treated component comprising a metal oxide and a porous filler material having crystalline mullite needles that enhance strength,
wherein the filler material has a microstructure of large secondary particles embedded in a matrix of mullite and glass thereby yielding pores, wherein the paving material is permeable to aqueous fluids and has a resistance to acidic rainwater greater than the resistance of concrete to acidic rainwater.

2. The paving material of claim 1, wherein the metal oxide comprises a component selected from a group consisting of $Al_2O_3$, $SiO_2$, $TiO_2$, CoO, MgO, $Na_2O$, $K_2O$, hydrated forms thereof, or combinations thereof.

3. The paving material of claim 1 comprising a combination of $Al_2O_3$ and $SiO_2$.

4. The paving material of claim 1, wherein the filler material comprises ceramic particles.

5. The paving material of claim 1, wherein the filler material comprises particles having average diameters that range from about 1/16 of an inch to about 1/4 of an inch.

6. The paving material of claim 1 having a rate of permeation ranging from about 1.0 to about 2.5 inches per minute.

7. The paving material of claim 1 further having a compressive strength ranging from about 6000 psi to about 8000 psi.

8. The paving material of claim 1 further comprising an additive that provides a desired color to the paving material.

9. The paving material of claim 1 further comprising an additive that provides a non-slip surface to the paving material.

10. The paving material of claim 1 further having a unit form with a shape that provides structural integrity to a network of the unit forms, a non-slip surface, a support for the addition of other components unrelated to paving, or a combination thereof.

11. The paving material of claim 1 further having a compressive strength exceeding 8000 psi.

12. A method of constructing a porous ceramic pavement, comprising:
    applying a permeable base material to a surface to provide support and drainage;
    placing a paving material on the base material, the paving material comprising
        a heat-treated component comprising a metal oxide and a porous filler material having crystalline mullite needles that enhance strength,
        wherein the filler material has a micro structure of large secondary particles embedded in a matrix of mullite and glass thereby yielding pores,
        wherein the paving material is permeable to aqueous fluids and has a resistance to acidic rainwater greater than the resistance of concrete to acidic rainwater.

13. The method of claim 12, wherein the paving material is formed in modules.

14. The method of claim 12, further comprising applying a second base material to a top surface of the pavement.

15. The method of claim 14, wherein the second base material comprises a plurality of layers and a barrier layer to prevent migration of materials between the plurality layers.

* * * * *